United States Patent [19]

Sakai et al.

[11] Patent Number: 4,844,724
[45] Date of Patent: Jul. 4, 1989

[54] METHOD OF ADJUSTING REFRACTIVE INDEX DISTRIBUTION LENSES

[75] Inventors: Hiroyuki Sakai; Yoshiyuki Asahara, both of Tokyo; Shigeaki Omi, Saitama; Shin Nakayama; Yoshitaka Yoneda, both of Tokyo, all of Japan

[73] Assignee: Hoya Corporation, Tokyo, Japan

[21] Appl. No.: 129,287

[22] Filed: Dec. 7, 1987

Related U.S. Application Data

[62] Division of Ser. No. 759,311, Jul. 26, 1985, abandoned.

[30] Foreign Application Priority Data

Nov. 29, 1984 [JP] Japan ................................ 59-250426

[51] Int. Cl.$^4$ ...................... C03B 27/02; C03B 32/00
[52] U.S. Cl. ................................... 65/3.11; 65/30.13; 65/116
[58] Field of Search ...................... 65/116, 30.13, 3.11

[56] References Cited

PUBLICATIONS

Applied Optics, vol. 21, No. 6, Mar. 15, 1982, pp. 1063–1065, High Index Gradient in Glass by Ion Exchange, J. L. Coutoiz et al.

Primary Examiner—Arthur Kellogg
Attorney, Agent, or Firm—Cushman, Darby & Cushman

[57] ABSTRACT

The refractive index distribution in refractive index distribution lenses may be adjusted to better approach an ideal by heating the refractive index distribution lens. When the refractive index distribution lens was created by diffusion of refractive index changing ions into a body, further heating in an environment in which no additional ions can diffuse into the body causes further migration of ions within the body so that its refractive index distribution approaches an ideal.

4 Claims, 4 Drawing Sheets

METHOD OF ADJUSTING REFRACTIVE INDEX DISTRIBUTION LENSES

This is a division of application Ser. No. 759,311 filed July 26, 1985, now abandoned.

BACKGROUND OF THE INVENTION

1. Field of the Invention

The present invention relates to method of manufacturing refractive index distribution type lenses having large numerical aperture and a low aberration.

2. Description of the Prior Art

In optical fiber communication systems, it is desirable to optimize coupling between a light source, such as a semiconductor laser or a light emitting diode, and an optical fiber serving as a transmitting path. Generally, light from the source is focused by using an optical element such as a lens, or the like, to thereby improve coupling efficiency. As the optical element, spherical lenses, rod lenses of the gradient refractive index type, planar microlenses and the like have been proposed.

To manufacture various gradient refractive index planar lenses, for example, ions for causing a different refractive index are diffused into the surface of glass through ion exchange. That is, a lens portion having a relatively large refractive index is obtained by using this method and therefore it is possible to manufacture a gradient refractive index type lens having a large numerical aperture.

A lens 1 having a refractive index gradient in the plate is provided with a semi-cylindrical refractive index gradient region 2 as shown in FIG. 1. In region 2, the refractive index ideally varies according to a quadratic curve from in the plane surfaces in the X- and Z-directions, and is constant in the Y-direction, as shown in FIG. 2. However, it is not easy to obtain an ideal refractive index distribution as expressed by the following formula:

$$n(x)^2 = n_0^2(1 - g^2 x^2) \quad (1)$$

where n(x) represents a refractive index in the direction of the thickness, $n_0$ a refractive index on the slab surface, and g a quadratic constant of the distribution. That is, a lens manufactured by this method has a large aberration.

SUMMARY OF THE INVENTION

The present invention overcomes these prior art problems. An object of the present inventio is to obtain a gradient refractive index type lens having a low aberration, by further heating a glass body which has been subjected to ion exchange so as to further diffuse refractive index changing ions to make the refractive index distribution approach an ideal one.

In order to attain the above-mentioned object according to the present invention, a glass body which has been subjected to ion exchange by being immersed in fused salt is subjected to a heat treatment. That is, after a continuous distribution of ions for changing the refractive index had been formed in a glass body by introducing ions through the surface of the glass body and allowing the ions to diffuse, the glass body is heat treated so that the glass body does not touch fused salt, for example, in air, so as to cause ions to diffuse further in the glass body thereby approaching an ideal refractive index distribution.

BRIEF DESCRIPTION OF THE DRAWINGS

These and other objects and advantages of this invention will become more apparent and more readily appreciated from the following detailed description of the preferred embodiments of this invention, taken in conjunction with the accompanying drawings, of which.

DETAILED DESCRIPTION OF THE PREFERRED EMBODIMENTS

Figure 1:
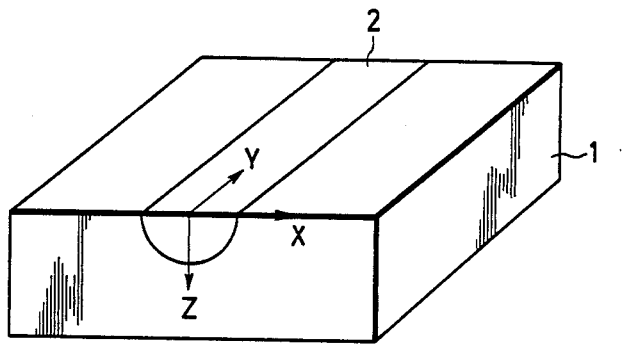
FIG. 1 is a perspective view of the prior art planar micro lens having a semi-cylindrical refractive index distribution region.
Figure 2:
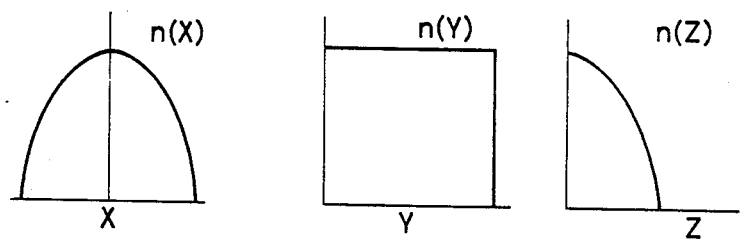
FIG. 2 is a diagram showing the refractive index distribution of the lens in FIG. 1 in the X-, Y- and Z-directions.
Figure 3:
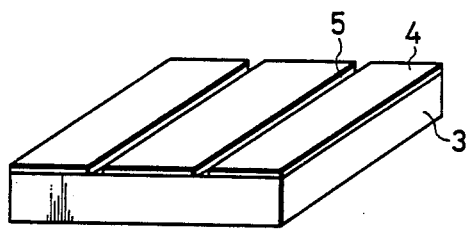
FIG. 3 is a perspective view of a glass plate on which a mask having slit-like openings is placed.
Figure 4:
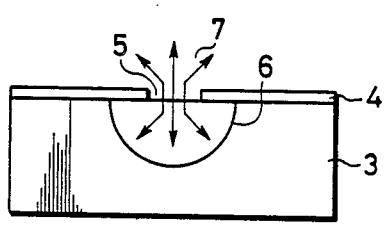
FIG. 4 is a schematic demonstration of the ion exchange process through the mask openings.

FIG. 3 shows, as an example, a mask 4 which is impermeable for ions, such as a titanium film or the like, placed on a surface of glass plate 3. Mask 4 has slit-like openings 5. Glass plate 3 with mask 4 is immersed into fused salt, such as silver, thallium, or the like, containing ions for causing a high refractive index. In this process, alkali ions in glass plate 3 and ions 7 (see FIG. 4) in the fused salt are exchanged by diffusion through openings 5 as shown and if the openings are slit-like, semi-cylindrical ion concentration distribution regions 6 are formed in glass plate 3.

Figure 5A:
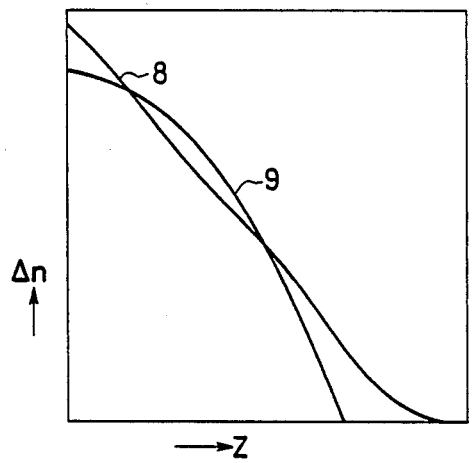
FIG. 5A is a diagram showing the comparison between the refractive index distribution obtained by the ion exchange method and an ideal distribution.
Figure 5B:
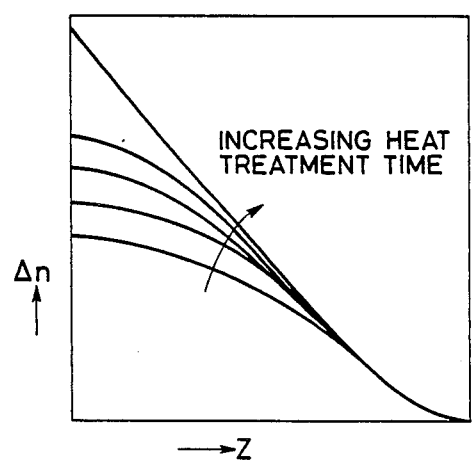
FIG. 5B is a diagram showing changes in refractive index distribution with different heat treatment times.

However, since the obtained distribution pattern represented by curve 8 in FIG. 5A differs from the ideal pattern represented by a curve 9, it is difficult to say that such a refractive index distribution obtained in this process is ideal for a lens. Therefore, a glass plate in which such ion exchange has been performed, is heat treated so that ion exchange cannot be caused inside and outside the glass, for example, in air, so that the refractive index distribution is changed into an ideal one as a lens as shown in FIG. 5B. This is achieved by further the ions within glass plate 3. Surface mask 4 is then removed from glass plate 3 having the improved refractive index distribution region and the glass plate is ground and polished to thereby obtain the distribution refractive index plate microlens having a low aberration.

If openings 5 is mask 4 are circular, it is a matter of course that a gradient refractive index planar microlense of low abberation having a semispherical refractive index distribution region can be obtained.

Figure 6:
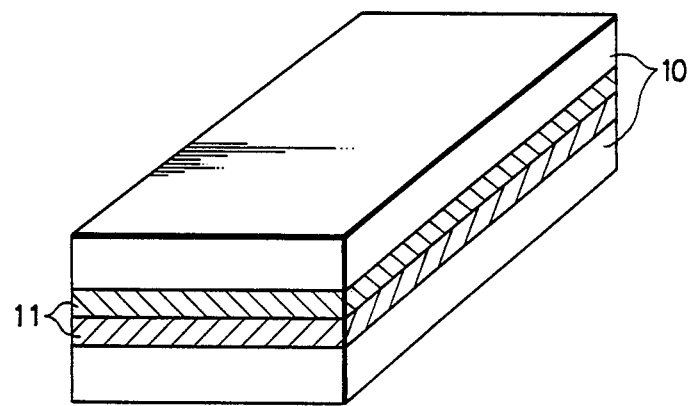
FIG. 6 is a perspective view of a slab lens in accordance with the present invention.
Figure 5B:
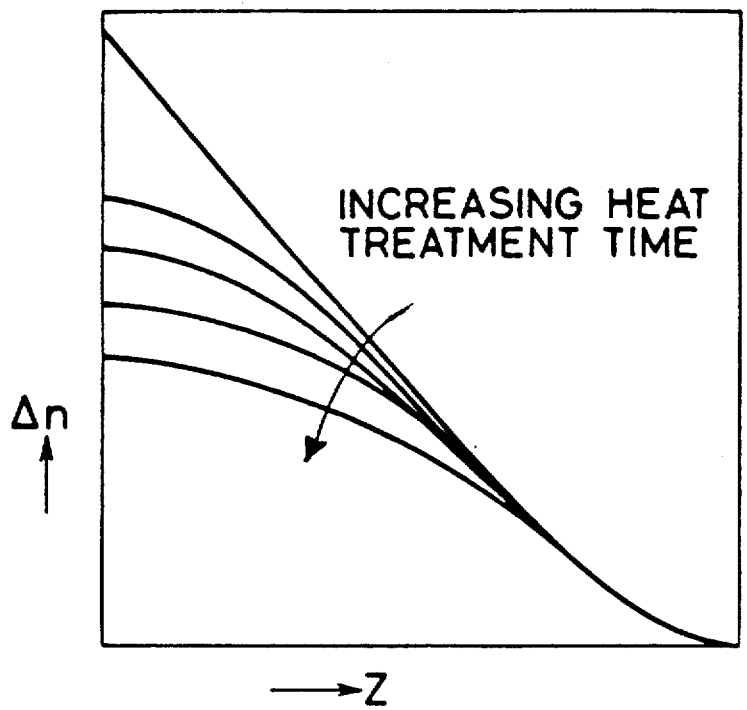

Furthermore, it is possible to obtain a low aberration large numerical aperture slab lens by applying the heat treatment process as described above to the method of manufacturing a slab lens having a unidirectional layered refractive index distribution region. That is, after ion exchange has been effected from one surface of a glass plate with no mask attached, the glass plate is subjected to appropriate heat treatment to thereby control the refractive index distribution. Thereafter, such glass plates 10 and 10 are put together as shown in FIG. 6 such that their surfaces 11 and 11 each having a refractive index distribution, are placed together, and the surfaces of this assembly perpendicular to the put-together surfaces are polished as the end surfaces of the thus obtained slab lens.

Further, in manufacturing a slab lens the surfaces, each having a refractive index distribution corresponding to two glass plates which have been subject to ion exchange, are put together face to face and then this glass plate assembly is subjected to pressing and heating so that the steps of bonding the two glass plates and adjusting the refractive index distribution by the heat treatment can be performed simultaneously.

EXAMPLE 1

A mask 4 of Ti film having a thickness of 2 μm and formed with slit-like openings each having a width of 0.2 mm was put on a surface of a 20×20×5 mm glass plate 3 composed of optical glass referred to as TiF$_6$ (composition by weight percent; 47.7% of P$_2$O$_5$, 19.8% of Na$_2$O, 7.7% of K$_2$O, 3.7% of Al$_2$O$_3$, 15.4% of TiO$_2$, and 5.7% of others). Next, glass plate 3 with mask 4 was immersed in fused salt of 350° C., composed of 40% of AgNO$_3$, 60% of KNO$_3$ by percent weight, for 100 hours to thereby perform ion exchange. Then, the glass plate was subjected to heat treatment in the atmosphere at 350° C. for 20 hours. Thereafter, Ti film 4 was removed from the surface of the glass plate and polishing was performed to thereby obtain a lens body having a substantially semi-cylindrical refractrive index distribution region having a radius of about 1.3 mm and a difference in refractive index of 0.094.

When the refractive index distribution in the X-direction of this lens was approximated in accordance with equation (1), the value of standard deviation before heat treatment was $820 \times 10^{-5}$, while the value after the treatment became $14 \times 10^{-5}$ so that the refractive index distribution came closer to the distribution defined in equation (1).

EXAMPLE 2

Glass referred to as "TiF$_6$" having the same composition as that in Example 1 was worked into a plate-like shape 10 of 20×20×5 mm. After immersion in fused salt, at 350° C., composed of 40% of AgNO$_3$ and 60% of KNO$_3$ by percent weight, for 100 hours to thereby effect ion exchange, the glass was heat treated in the atmosphere at 350° C. for 20 hours.

The thus obtained glass was polished at its diffusion surface 11 having a refravice index distribution. Two pieces of the treated glass were put together with the respective diffusion surfaces face to face as shown in FIG. 6, cut perpendicularly to the diffusion surfaces, and then polished, thereby obtaining a slab lens of low aberration and large numerical aperture, that is, having a refractive index difference of 0.17 and a numerical aperture of 0.83. Here, when the refractive index distribution before and after the heat treatment was approximated with equation (1), the standard deviation was remarkably changed from $380 \times 10^{-5}$ to $95 \times 10^{-5}$, and it was proved that the refractive index distribution approached the equation (1) distribution.

Only several preferred embodiments have been described in detail above. However those skilled in the art may readily appreciate that many modifications are possible in the preferred embodiments without materially departing from the novel teachings and advantages of this invention. For example, the present invention may be employed with any refractive index distribution lenses.

Accordingly, all such modifications are intended to be included within the scope of the following claims.

What is claimed is:

1. A method of forming a gradient refractive index lens with an adjusted refractive index distribution comprising the steps of:

applying a mask having openings on a surface of phosphate glass body;

immersing said phosphate glass body with said mask into a fused salt containing silver ions for causing a high refractive index so as to cause ions in said phosphate glass to be exchanged with said silver ions in said salt to form a refractive index distribution lens; and heating said glass body in an environment in which no further ions may diffuse into said glass body to approach an ideal refractive distribution by further migration of said silver ions in said glass body.

2. The method as in claim 1 wherein said immersing step includes the step of immersing a phosphate glass plate in said fused salt.

3. The method as in claim 1 wherein said applying step includes attaching a mask with elongated openings.

4. The method as in claim 1 wherein said applying step includes attaching a mask with circular openings.

* * * * *

UNITED STATES PATENT AND TRADEMARK OFFICE
CERTIFICATE OF CORRECTION

PATENT NO. : 4,844,724

DATED : July 4, 1989

INVENTOR(S) : Hiroyuki Sakai, et al.

It is certified that error appears in the above-identified patent and that said Letters Patent is hereby corrected as shown below:

Delete Fig. 5B and substitute Fig. 5B as shown on the attached page.

Signed and Sealed this

Seventh Day of August, 1990

Attest:

HARRY F. MANBECK, JR.

*Attesting Officer*         *Commissioner of Patents and Trademarks*